United States Patent
Giffels et al.

(10) Patent No.: US 9,633,309 B2
(45) Date of Patent: Apr. 25, 2017

(54) DISPLAYING QUALITY OF QUESTION BEING ASKED A QUESTION ANSWERING SYSTEM

(71) Applicant: International Business Machines Corporation, Armonk, NY (US)

(72) Inventors: Kenneth M. Giffels, Mansfield, MA (US); Christopher J. Karle, Wayland, MA (US); William G. O'Keeffe, Tweksbury, MA (US); Ketan T. Patel, Lowell, MA (US); David D. Taieb, Charlestown, MA (US); Sabrina Yee, Norfolk, MA (US)

(73) Assignee: International Business Machines Corporation, Armonk, NY (US)

(*) Notice: Subject to any disclaimer, the term of this patent is extended or adjusted under 35 U.S.C. 154(b) by 309 days.

(21) Appl. No.: 14/309,637

(22) Filed: Jun. 19, 2014

(65) Prior Publication Data

US 2015/0371137 A1 Dec. 24, 2015

(51) Int. Cl.
*G06F 17/00* (2006.01)
*G06N 5/02* (2006.01)
(Continued)

(52) U.S. Cl.
CPC .......... *G06N 5/02* (2013.01); *G06F 17/271* (2013.01); *G06F 17/3053* (2013.01); *G06F 17/30654* (2013.01); *G06N 5/04* (2013.01)

(58) Field of Classification Search
USPC .......................................................... 706/46
See application file for complete search history.

(56) References Cited

U.S. PATENT DOCUMENTS

| | | | | |
|---|---|---|---|---|
| 6,718,519 B1 * | 4/2004 | Taieb | ................... | G06F 17/2217 715/269 |
| 6,813,747 B1 * | 11/2004 | Taieb | ................... | G06F 17/2217 715/269 |
| 7,031,002 B1 * | 4/2006 | Taieb | ................... | G06F 17/2223 358/1.11 |
| 7,707,257 B2 * | 4/2010 | Taieb | ................... | G06Q 10/109 709/204 |
| 8,122,342 B2 * | 2/2012 | Karle | ................... | G06F 17/2247 715/205 |
| 9,063,975 B2 * | 6/2015 | Isensee | ............. | G06F 17/30477 |
| 9,230,009 B2 * | 1/2016 | Alkov | ............... | G06F 17/30598 |

(Continued)

FOREIGN PATENT DOCUMENTS

| | | |
|---|---|---|
| WO | WO2009/143395 A1 | 11/2009 |
| WO | WO2011/126458 A1 | 10/2011 |

OTHER PUBLICATIONS

Smartphone Response System Using Twitter to Enable Effective Interaction and Improve Engagement in Large Classrooms Yeongjun Kim; Soonmook Jeong; Yongwoon Ji; Sangeun Lee; Key Ho Kwon; Jae Wook Jeon IEEE Transactions on Education Year: 2015, vol. 58, Issue: 2 pp. 98-103, DOI: 10.1109/TE.2014.2329651 IEEE Journals & Publications.*

(Continued)

*Primary Examiner* — Michael B Holmes
(74) *Attorney, Agent, or Firm* — Stephen R. Tkacs; Stephen J. Walder, Jr.; Diana R. Gerhardt

(57) ABSTRACT

A mechanism is provided in a data processing system for automatically generating question and answer pairs for training a question answering system for a given domain. The mechanism receives user input of question text for a question to be submitted to a question answering system in a user interface. The mechanism determines a question strength score for the question text. The question strength score represents a likelihood the question text will result in a correct answer with high confidence. The mechanism presents a graphical representation of the question strength score in the user interface.

18 Claims, 6 Drawing Sheets

(51) Int. Cl.
*G06F 17/27* (2006.01)
*G06F 17/30* (2006.01)
*G06N 5/04* (2006.01)

(56) References Cited

U.S. PATENT DOCUMENTS

| | | | | |
|---|---|---|---|---|
| 9,280,908 | B2* | 3/2016 | Isensee | G09B 7/02 |
| 9,286,153 | B2* | 3/2016 | Giffels | G06F 11/0769 |
| 9,401,881 | B2* | 7/2016 | Isensee | H04L 51/02 |
| 9,471,601 | B2* | 10/2016 | Ahuja | G06F 17/30268 |
| 9,495,387 | B2* | 11/2016 | Ahuja | G06F 17/30268 |
| 9,519,477 | B2* | 12/2016 | Champlin-Scharff | G06F 15/18 |
| 2004/0194141 | A1 | 9/2004 | Sanders | |
| 2006/0287907 | A1 | 12/2006 | Kim | |
| 2007/0136246 | A1 | 6/2007 | Stenchikova et al. | |
| 2009/0287678 | A1 | 11/2009 | Brown et al. | |
| 2011/0066587 | A1 | 3/2011 | Ferrucci et al. | |
| 2011/0125734 | A1 | 5/2011 | Duboue et al. | |
| 2013/0007055 | A1 | 1/2013 | Brown et al. | |
| 2013/0017524 | A1 | 1/2013 | Barborak et al. | |
| 2013/0018652 | A1 | 1/2013 | Ferrucci et al. | |
| 2013/0066886 | A1 | 3/2013 | Bagchi et al. | |
| 2013/0282704 | A1 | 10/2013 | Pantel et al. | |
| 2014/0072947 | A1 | 3/2014 | Boguraev et al. | |
| 2015/0302097 | A1 | 10/2015 | Focacci | |

OTHER PUBLICATIONS

Sentence generation from a bag of words using N-gram model Arun Kumar Yadav; Samir Kumar Borgohain 2014 IEEE International Conference on Advanced Communications, Control and Computing Technologies Year: 2014 pp. 1771-1776, DOI: 10.1109/ICACCCT.2014.7019414 IEEE Conference Publications.*

An extension of fill-in-the-blank problem function in Java programming learning assistant system Nobuo Funabiki; Yousuke Korenaga; Toru Nakanishi; Kan Watanabe 2013 IEEE Region 10 Humanitarian Technology Conference Year: 2013 pp. 85-90, DOI: 10.1109/R10-HTC.2013.6669019 IEEE Conference Publications.*

Management of Multimedia Data for Streaming on a Distributed E-learning System Tadafumi Hayakawa; Masayuki Higashino; Kenichi Takahashi; Takao Kawamura; Kazunori Sugahara 2012 26th International Conference on Advanced Information Networking and Applications Workshops pp. 1282-1285, DOI: 10.1109/WAINA.2012.194 IEEE.*

"Method of Computing Relevancy Score in a Question and Answering System", Disclosed Anonymously, www.ip.com, IPCOM000222407D, Oct. 2, 2012, 4 pages.

"Scoring terms in a question", IBM Corporation, www.ip.com, IPCOM000013933D, Jun. 19, 2003, 2 pages.

High, Rob, "The Era of Cognitive Systems: An Inside Look at IBM Watson and How it Works", IBM Corporation, Redbooks, 2012, 16 pages.

Yuan, Michael J. , "Watson and healthcare", IBM Corporation, developerWorks, http://www.ibm.com/developerworks/industry/library/ind-watson/, Apr. 12, 2011, pp, 1-14.

List of IBM Patents or Patent Applications Treated as Related (Appendix P), 2 pages.

Hoeks, John C. et al., "Questions Left Unanswered: How the Brain Responds to Missing Information", PLOS ONE, www.plosone.org, vol. 8, Issue 10, Oct. 2013, 9 pages.

List of IBM Patents or Patent Applications Treated as Related (Appendix P) dated Mar. 7, 2016, 2 pages.

* cited by examiner

DISPLAYING QUALITY OF QUESTION BEING ASKED A QUESTION ANSWERING SYSTEM

BACKGROUND

The present application relates generally to an improved data processing apparatus and method and more specifically to mechanisms for displaying a question quality score and question forming feedback for a question being asked of a question answering system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for presenting a question strength score for a question being asked of a question answering system. The method comprises receiving user input of question text for a question to be submitted to a question answering system in a user interface. The method further comprises determining a question strength score for the question text. The question strength score represents a likelihood the question text will result in a correct answer with high confidence. The method further comprises presenting a graphical representation of the question strength score in the user interface.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
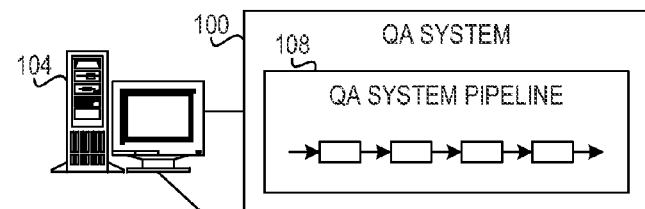
FIG. 1 depicts a schematic diagram of one illustrative embodiment of a question/answer creation (QA) system in a computer network.

The illustrative embodiments provide a mechanism for displaying the quality of a question being asked of a question answering (QA) system. Most users of a question answering system do not understand the inner workings of the system and may treat the question answering system as a search engine. The users may not realize that a poorly formed question will not return useful results until they submit the question. The users may conclude that unsatisfactory answers to questions are the fault of the system itself.

Question answering systems are good at answering different types of questions and not good at answering other types of questions. For example, a QA system may return a correct answer with high confidence for the question, "Who was the first man on the moon?" However, the system may give the wrong answer with very low confidence for the question, "first man on the moon," as a user might enter into a search engine. The system knows the types and formats of questions that it can answer well, but that information is not provided to the end user in any way.

The illustrative embodiments provide a mechanism to present a real-time visualization of the strength of the question being entered into a graphical user interface (GUI). In one example embodiment, the real-time visualization is a segmented bar. For a poorly formed question that is likely to result in an incorrect answer with low confidence, the mechanism presents few segments of the bar graph; for a well formed question that is likely to result in a correct answer with high confidence, the mechanism presents many segments of the bar graph. In another example embodiment, the GUI presents tips on improving the question. The better questions the end user asks, in theory, the fewer questions the user will ask to get a solution, thus reducing the load on the QA system, improving the user's experience, and increasing the return on investment for the customer.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 2:
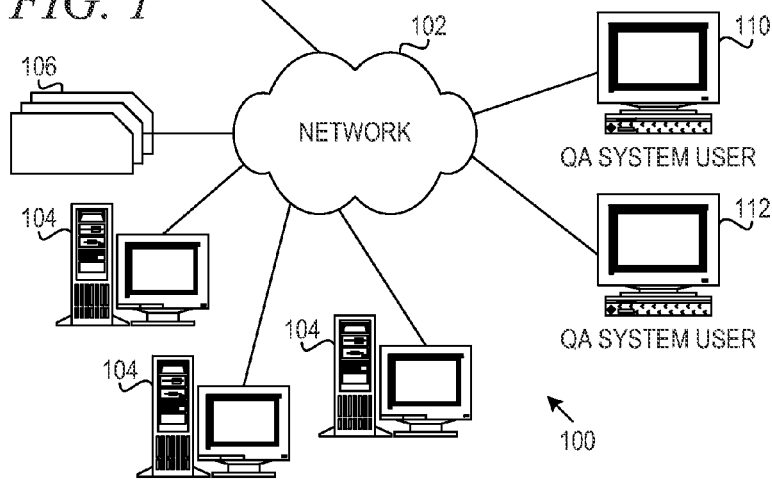
FIG. 2 is a block diagram of an example data processing system in which aspects of the illustrative embodiments may be implemented.
Figure 3:
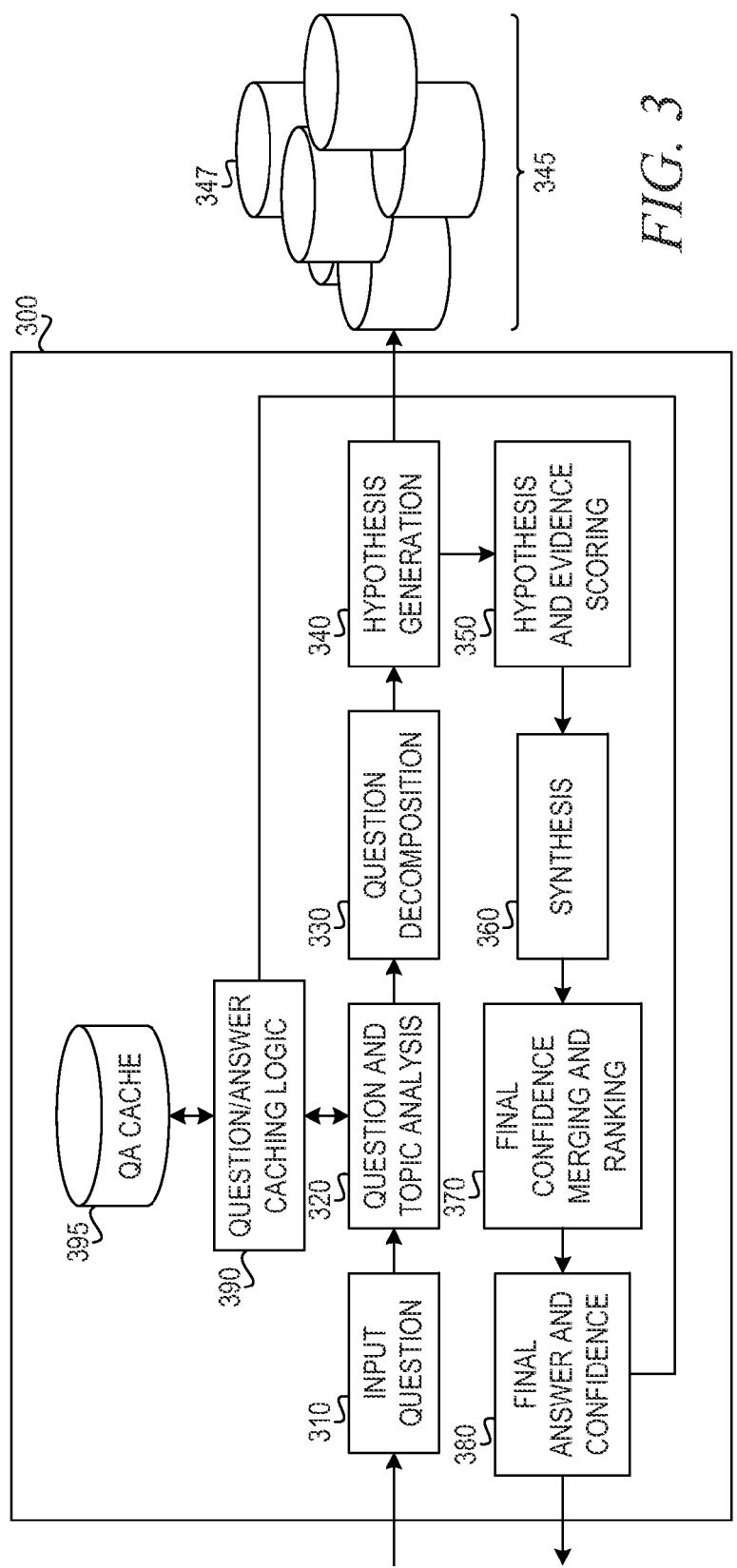
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model is then used to summarize a level of confidence that the Watson™ QA system has regarding the evidence that the potential response, i.e., candidate answer, is inferred by the question. This process is repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who was the first man on the moon?" In response to receiving the input question, the next stage of the QA system pipeline 300, i.e., the question and topic analysis stage 320, parses the input question using natural language processing (NLP) techniques to extract major features from the input question, classify the major features according to types, e.g., names, dates, or any of a plethora of other defined topics. For example, in the example question above, the term "who" is associated with a topic for "persons" indicating that the identity of a person is being sought, "man" is identified as a person with the male gender, and "moon" is indicative of a noun or other language topic.

On the other hand, the question, "first man on the moon," is not a full and properly formed question. The user may be asking "Who was the first man on the moon?" or "When did the first man land on the moon?" or even "What was the name of the NASA mission that put the first man on the moon?" In this example, assuming a fairly simple factoid style pipeline, QA system pipeline 300 determines the question is missing the "focus" of the question in accordance with the illustrative embodiments. Thus, question and topic analysis stage 320 scores such a question poorly.

The QA system has a hierarchical structure of labels for lexical types. In a question, two significant elements are the focus and the lexical answer type (LAT). The focus identifies whether the question is asking for a person, thing, place, reason, or solution (i.e., who, what, where, why, and how). In the above example, assuming a fairly simple factoid style pipeline, QA system pipeline 300 determines the question is missing the "focus" of the question in accordance with the illustrative embodiments. Thus, question and topic analysis stage 320 scores such a question poorly.

If the user asks a complete question, such as "Who was the first man on the moon?" then the question and topic analysis stage 320 determines the question has a distinct LAT ("man") and a distinct focus ("who"). This is the type of question the QA system can answer confidently, so it returns a much higher score. In accordance with the illustrative embodiments, question and topic analysis stage 320 generates a question strength score for the question. A mechanism in the QA system then presents a question strength visualization to the user. In one example embodiment, the mechanism presents the question strength visualization after the user has submitted the question to the QA system. This allows the user to judge the candidate answers and confidence values with reference to the strength of the question.

In another example embodiment, the mechanism presents the question strength visualization in real time as the user forms the question. This allows the user to reformulate the question to achieve a higher question strength score, which results in more correct answers with higher confidence and using fewer questions to the QA system.

In one embodiment, the mechanism presents tips on improving the question being asked. The mechanism may give general tips about how to form a complete, focused question. The mechanism may identify elements of the question, such as the focus or the LAT. In another example embodiment, the mechanism may identify terms in the lexicon that is ambiguous. The mechanism may then present a context menu of potential options to disambiguate the term.

The identified major features are then used during the question decomposition stage 330 to decompose the question into one or more queries to be applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345.

There may be different corpora 347 defined for different collections of documents based on various criteria depending upon the particular implementation. For example, different corpora may be established for different topics, subject matter categories, sources of information, or the like. As one example, a first corpus is associated with healthcare documents while a second corpus is associated with financial documents. Alternatively, one corpus comprises documents published by the U.S. Department of Energy while another corpus comprises IBM Redbooks documents. Any collection of content having some similar attribute is considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which compares the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

Figure 4A:
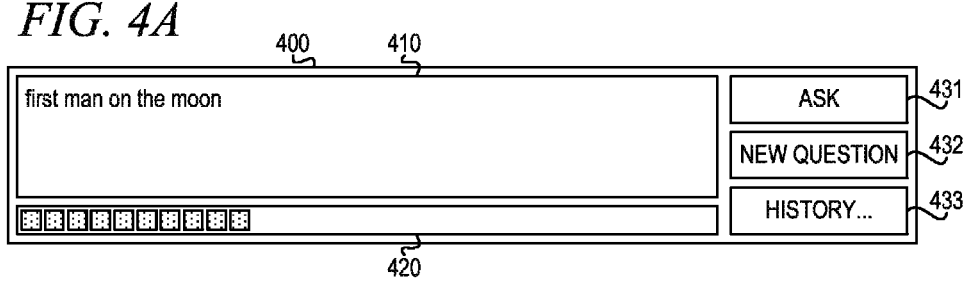
FIGS. 4A-4F depict example screens of a graphical user interface for displaying the quality of a question being asked of a question answering system in accordance with an illustrative embodiment.

FIGS. 4A-4F depict example screens of a graphical user interface for displaying the quality of a question being asked of a question answering system in accordance with an illustrative embodiment. With reference to FIG. 4A, graphical user interface (GUI) 400 includes a question forming portion 410 in which the user enters the text of a question. When the user is finished forming the question in question forming portion 410, the user selects submit ("ask") control 431 to submit the question to the QA system. The user selects clear ("new question") control 432 to clear question forming portion 410 to begin forming a new question. The user selects "history" control 433 to view a history of previous questions and possibly the candidate answers returned by the QA system.

In accordance with an illustrative embodiment, GUI 400 includes a question strength visualization 420, which presents a graphical indication of the strength of the question entered into question forming portion 410. In the depicted example, question strength visualization 420 is a segmented bar graph. For a poorly formed question that is likely to result in an incorrect answer with low confidence, the mechanism presents few segments of the bar graph. For a well formed question that is likely to result in a correct answer with high confidence, the mechanism presents many segments of the bar graph.

In the example shown in FIG. 4A, the question in question forming portion 410 is "first man on the moon," which is not a complete question. The user could be asking "Who was the first man on the moon?" "When did the first man land on the moon?" or even "What was the name of the NASA mission that put the first man on the moon?" In this example, assuming a fairly simple factoid style pipeline, the QA system determines the question is missing the focus of the question, so the question would score poorly, as indicated by question strength visualization 420.

In one example embodiment, the mechanism presents the question strength visualization after the user has submitted the question to the QA system. This allows the user to judge the candidate answers and confidence values with reference to the strength of the question. In another example embodiment, the mechanism presents the question strength visualization in real time as the user forms the question. This allows the user to reformulate the question to achieve a higher question strength score, which results in more correct answers with higher confidence and using fewer questions to the QA system.

Figure 4B:
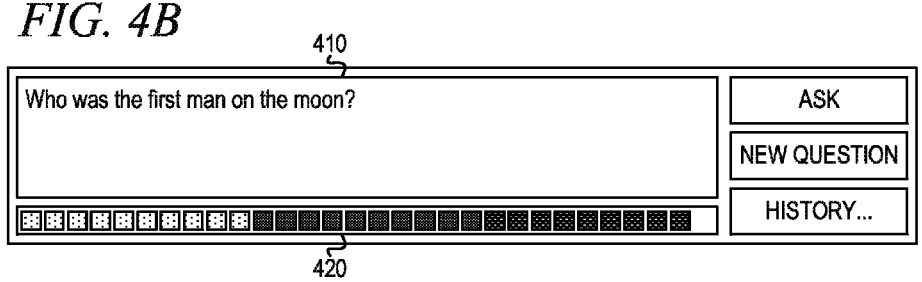

In the example shown in FIG. 4B, the user asks a complete question, "Who was the first man on the moon?" The QA system determines that the question has a distinct lexical answer type (LAT) ("man") and a distinct focus ("who"). The QA system should be able to answer this question confidently, so the QA system returns a higher question strength score, as indicated by question strength visualization 420 in FIG. 4B.

Figure 4C:
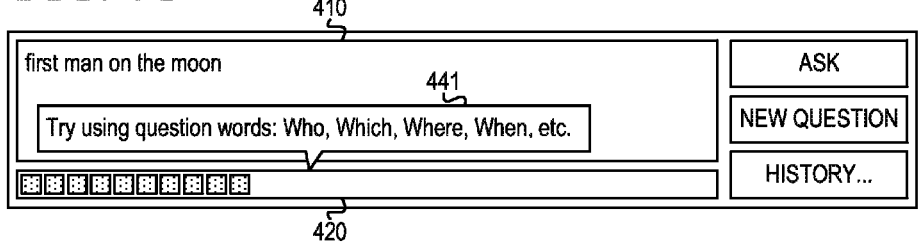

In the example shown in FIG. 4C, the question in question forming portion 410 is "first man on the moon," which is not a complete question. The QA system presents question forming feedback 441, which includes tips for improving the question. In one example embodiment, the QA system may present question forming feedback 441 in response to the user hovering the mouse over or clicking on question strength visualization 420.

It is not enough to simply show the user that the question needs to be rephrased. In the depicted example, the QA system tells the user how to rephrase the question. However, telling the user, "please, provide a focus for the question," would be unreasonable, because the user may not know what the focus of a question is. Instead, the QA system provides simplified instructions, such as "Try using question words: Who, Which, Where, When, etc." In this example, the question forming feedback 441 provides instructions to the user; however, other designs are also possible. Question forming feedback 441 may alternatively present a broader set of instructions or general guidelines on question construction. In another alternative embodiment, GUI 400 includes a separate information button for users to access question forming feedback 441.

Figure 4D:
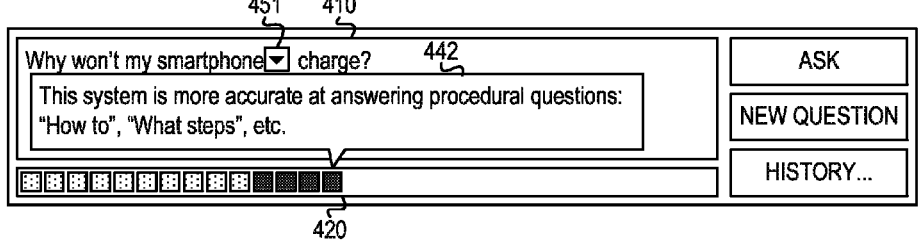
Figure 4E:
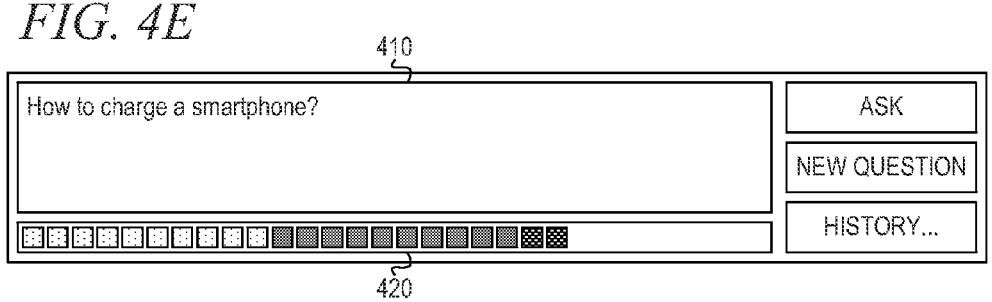

FIG. 4D illustrates an example question for a pipeline that is designed to answer procedural questions. In this case, the system expects questions to start with phrases like "How can I," "How to," "What are the steps," "What is the procedure," etc., as determined by the question classifier. The question in question forming portion 410 asks, "Why won't my smartphone charge?" If the system runs the question in question forming portion 410 through the same classifier and the question does not appear to be a procedural question, then the system may not answer the question correctly or with high confidence. In depicted example, it is likely that the question would score poorly, as indicated by question strength visualization 420. The system presents question forming feedback 442 to encourage the user to ask the question in a format the pipeline is better able to understand. As shown in FIG. 4E, asking the question "How to charge a smartphone?" in question forming portion 410 results in an improved score in question strength visualization 420.

In one example embodiment, the system may offer controls to disambiguate portions of the question. As an example, in the question, "What is the capital of Georgia?" the word "Georgia" is ambiguous, because it may refer to Georgia the state or Georgia the country. In this example, the disambiguation control allows the user to select between potential options of "Georgia, State, USA" and "Georgia, Country." A disambiguation control allows the user to expand on acronyms that may be ambiguous to their full and correct form. For instance, ATM can be expanded to "automated teller machine" or "asynchronous transfer mode." This information may be incorporated into the question scorer to help in determining the strength of the question.

In the example shown in FIG. 4D, the term "smartphone" is ambiguous. In the lexicon, the term "smartphone" is related to other terms, particularly different types or brands of smartphones. The QA system presents disambiguation control 451, which in the depicted example allows the user to view a drop-down list of suggestions to disambiguate the term. In one example embodiment, the list of suggestions may be a list of high level categories, which may be further disambiguated. For example, the term "smartphone" may be disambiguated to a particular mobile operating system, which may be further disambiguated to a particular manufacturer, which may be further disambiguated to a particular model. Alternatively, the list may be a nested list with particular models listed under each brand name, for example. One would expect that using disambiguation control 451 will result in improved question score results in question strength visualization 420.

Figure 4F:
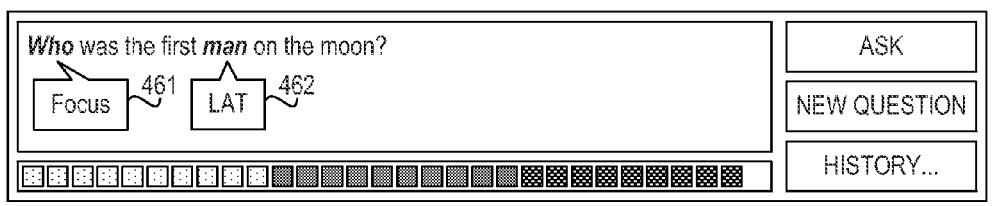

In FIG. 4F, for more advanced users, the QA system can highlight question elements, such as focus 461 and LAT 462, so the user can better understand how the QA system interprets the question. Alternatively, the QA system allows advanced users to manually specify focus 461 and LAT 462, if desired. A potential implementation of that is for a user to highlight the portion of text (e.g., "man") and use a context menu (e.g., a right-click menu) to allow the user to mark up the question.

Beyond specifying a LAT and focus, the QA system may allow the user to add specific weights for particular terms or phrases in the question to tell the QA system which parts of the question are more important relative to others. This could be particularly useful for passage style questions, where there is a lot of text in the question. For example, the user may ask the following:

"My phone is no longer under warranty, but I'm having trouble with it and want to know what I can do about it. For some reason it's not charging. BTW, it's the version 4S. It has a cracked screen if that matters, but it used to still charge after that happened."

A user may ask the above question to a customer service representative in a contact center. The representative may copy the question into question forming portion 410 in GUI 400 to ask the question to the QA system. GUI 400 allows the representative to mark the question to indicate "version 4S" and "not charging" are the most important elements of the question and "cracked screen" and "no longer under warranty" are less important. Marking up the question in this way tells the QA system that the representative is really interested in known why a version 4S phone will not charge rather than finding warranty information about cracked screens.

Typically, a QA system is a complicated product that can support multiple question classifications and multiple question styles. There are also subtle features of a question construct that affect the accuracy of the system. For example, "What is the capital city of China" and "The capital city of China is what?" are basically the same question; however, that simple grammatical difference can have a big effect on the answer confidence.

Hard coding every conceivable question classification and question style into the QA system really is not a practical solution. An illustrative embodiment uses a combination of the question history of the entire pipeline along with running a subset of question analysis to programmatically determine the question strength score.

Figure 5:
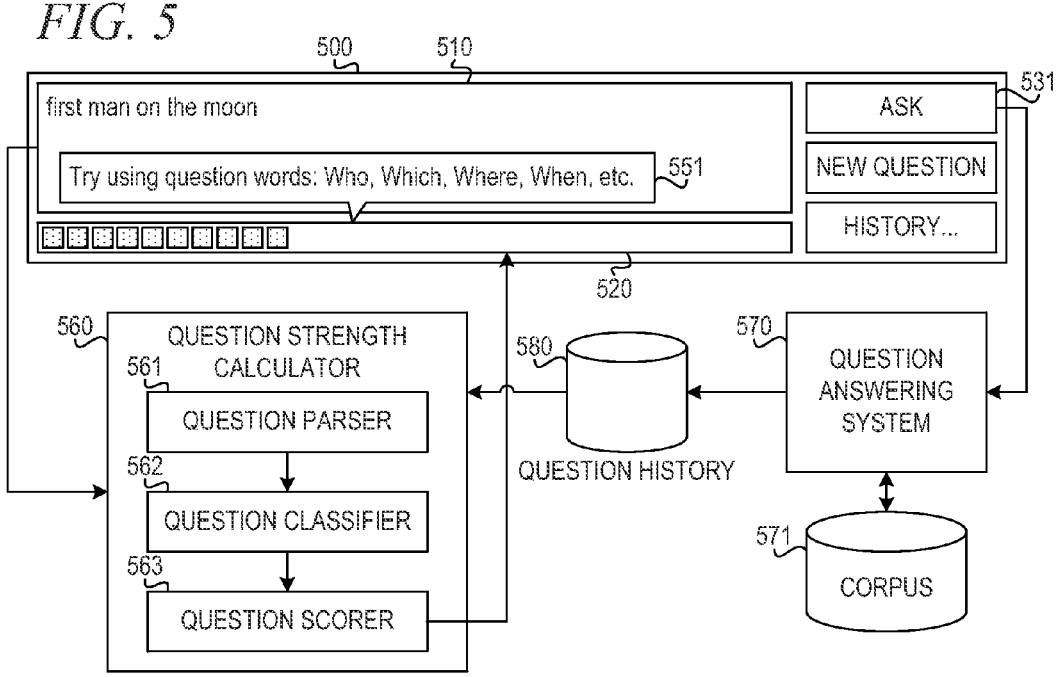
FIG. 5 is a block diagram illustrating a mechanism for displaying the quality of a question being asked of a question answering system using question history and question analysis in accordance with an illustrative embodiment.

FIG. 5 is a block diagram illustrating a mechanism for displaying the quality of a question being asked of a question answering system using question history and question analysis in accordance with an illustrative embodiment. As the user enters a question into question forming portion 510 of graphical user interface (GUI) 500, the mechanism sends the question text to question strength calculator 560 to generate a question strength score and question forming feedback. The mechanism displays question strength visualization 520 and question forming feedback 551 in GUI 500 in real time.

Question strength calculator 560 includes question parser 561, question classifier 562, and question scorer 563. Question parser 561 parses the question text to obtain the natural language processing (NLP) structure. For instance, question parser 561 identifies parts of speech and the question structure, including the focus and lexical answer type, if present. In one embodiment, question parser 561 identifies words in the lexicon and mark words that may be ambiguous.

Figure 6A:
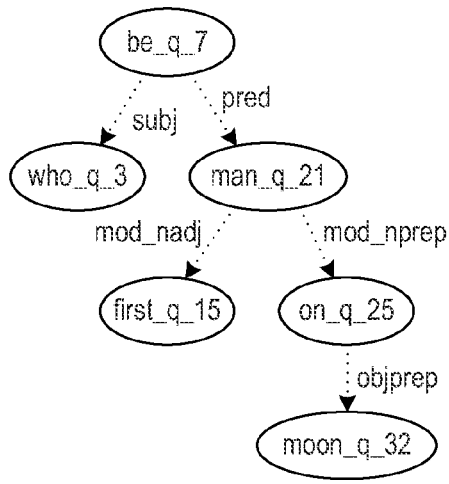
FIGS. 6A-6C depict example parse trees of input questions in accordance with an illustrative embodiment.
Figure 6C:
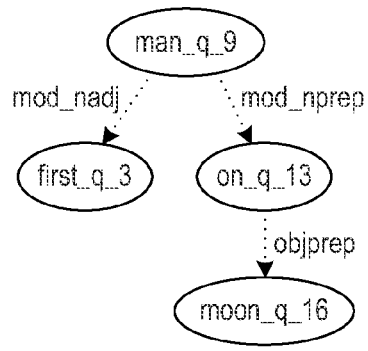
Figure 6B:
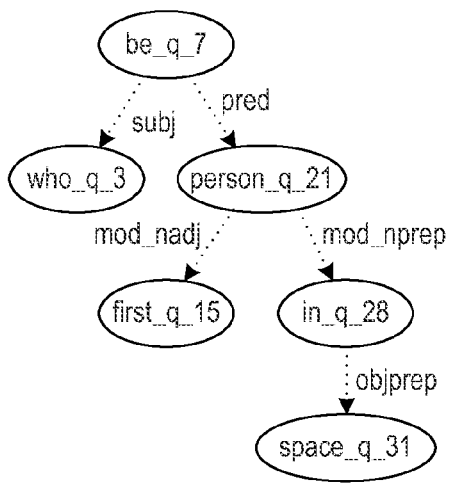

FIGS. 6A-6C depict example parse trees of input questions in accordance with an illustrative embodiment. FIG. 6A depicts an example parse tree of the question, "Who was the first man on the moon?" This represents a complete parse of a well-formed question that has a clear focus of "Who" and a clear lexical answer type of "man." Depending on the particular pipeline implementation, the importance of having a clear LAT and focus will vary. The term "who" does not seem ambiguous, but it can be. For example, if the question was, "Who got to the moon first?" the term "who" can refer to the astronaut/cosmonaut or to the country. The mapping of "who" to "man" in the question is important. Because the QA system cannot refine "who" in the question, "Who got to the moon first?" that question is considered more ambiguous and will score lower.

FIG. 6B depicts an example parse tree of the question, "Who was the first person in space?" In this case, the focus, "who," is mapped to the LAT, "person." The term "person" is a superset of "man"; therefore, this question is more ambiguous than the question, "Who was the first man in space?" or "Who was the first woman in space?" Therefore, the question shown in FIG. 6B, the question will be scored lower. The same is true for any modifiers on the LAT. The input question asks for the "first" person, which helps the system to narrow the scope of potential answers. For example, the question, "Who was a person in space?" would have a very similar parse tree, but would be a very ambiguous question. There are hundreds of equally valid answers for that question.

FIG. 6C depicts an example parse tree of the partial question, "first man on the moon." The focus, "man," is not a question word, such as "who," "what," "where," "why," "when," etc. The question does not have a LAT; therefore, it is extremely difficult to disambiguate that statement to answer a question. Apart from that, the fact that the first word is not capitalized is an indicator of an incomplete or poorly written question.

The same goes for not having a question mark at the end. While the lack of a question mark may not be a significant problem for the question shown in FIG. 6C, consider the question, "remember back during the space race between Rusia and the usa, who was the first man to set foot on the moon, I can't remember for some reason." The above is a long, rambling piece of text, but if it were properly written, it would have good information for finding an answer with high confidence. The text gives a reference time period in history and indicates the user is looking for a man who was the first on the moon. However, the text also includes a useless final clause.

In addition, the word, "Rusia," is misspelled, and the capitalization of "usa" is wrong. The word, "usa" could be a misspelling of "us" or an acronym of the United States of America. Perhaps the phrase, "who was the first man to set on the moon," was intended to be a modifier of "usa." Simply finding the question becomes difficult. The question may be whether the QA system can remember something, who the first man on the moon was, or why the user cannot remember something. Capitalization and punctuation form a very important part of a well-structured question.

Adding context around a question is good and may improve the score. In the example question, "Who was the first person in space? The Russian guy," adding "The Russian guy" to the end improves the score, because of the added context information. The QA system knows the user is asking for the name of a Russian man. However, adding too much additional context may cause the score to decrease. Consider the following example:

"Who was the first person in outer space? That soviet guy who went up in the sixties. I think the spaceship was named Vostok or something. There were a few different versions, but I'm pretty sure it was the 3 kA version that they used for the manned flights."

There is such a thing as too much information, and adding too much context simply adds noise, which decreases the confidence in finding a correct answer. This is especially true when there is more than one question in the question text. For example, consider the question, "Who was the first man on the moon? And when did he land?" The QA system can answer only one question at a time; therefore determining the question to answer within the question text is very important.

Returning to FIG. 5, question classifier 562 classifies the question to find the question type. Example question types include true/false, procedural, factoid, etc. The mechanism uses information determined by question parser 561 and question classifier 562 to generate question forming feedback to be presented in GUI 500.

When a user is satisfied with a question, the user selects "Ask" control 531 to submit the question to question answering (QA) system 570, which formulates candidate answers with associated confidence scores from corpus 571, as discussed above with reference to FIGS. 1 and 3. QA system 570 stores past questions, candidate answers, confidence scores, and user ratings in question history 580. In one example embodiment, QA system 570 maintains only the top X % of questions, based on high confidence answers and/or high user ratings, in question history 580, where X is a tunable value. That is, one may increase the value of X to provide more accurate results or decrease the value of X to save storage. These top questions then become the control set of questions to which subsequent questions are compared. Question scorer determines a question strength score using information obtained from question parser 561 and question classifier 562 and based on question history 580.

Question strength calculator 560 takes all the questions of each type and parses and compares their grammatical structure. This provides a basis for the properties required to receive good results from QA system 570 for each question type. As a question is entered into question forming portion 510 in GUI 500, question strength calculator 560 parses the question structure, classifies the question to identify the question type, and compares the question structure and question type to the set of known good structures for that question type.

If question classifier 562 fails to classify the question, question scorer 563 scores the question very low, and the mechanism prompts the user to rephrase the question via question forming feedback 551. For a question type for which questions in question history 580 have high confidence, i.e., highly ranked answers, the mechanism prompts the user to restructure the question to be of that question type.

In one embodiment, question strength score calculator 560 identifies one or more questions in question history 580 having similar features and the same question type. Question scorer 563 calculates the question strength score based on confidence scores of the identified questions. In one example, question scorer 563 averages the confidence scores of the identified questions. In alternative embodiments, question scorer 563 uses other algorithms to calculate the question strength score, such as using the lowest confidence score, weighting multiple scores based on the number of similar features, and so forth.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
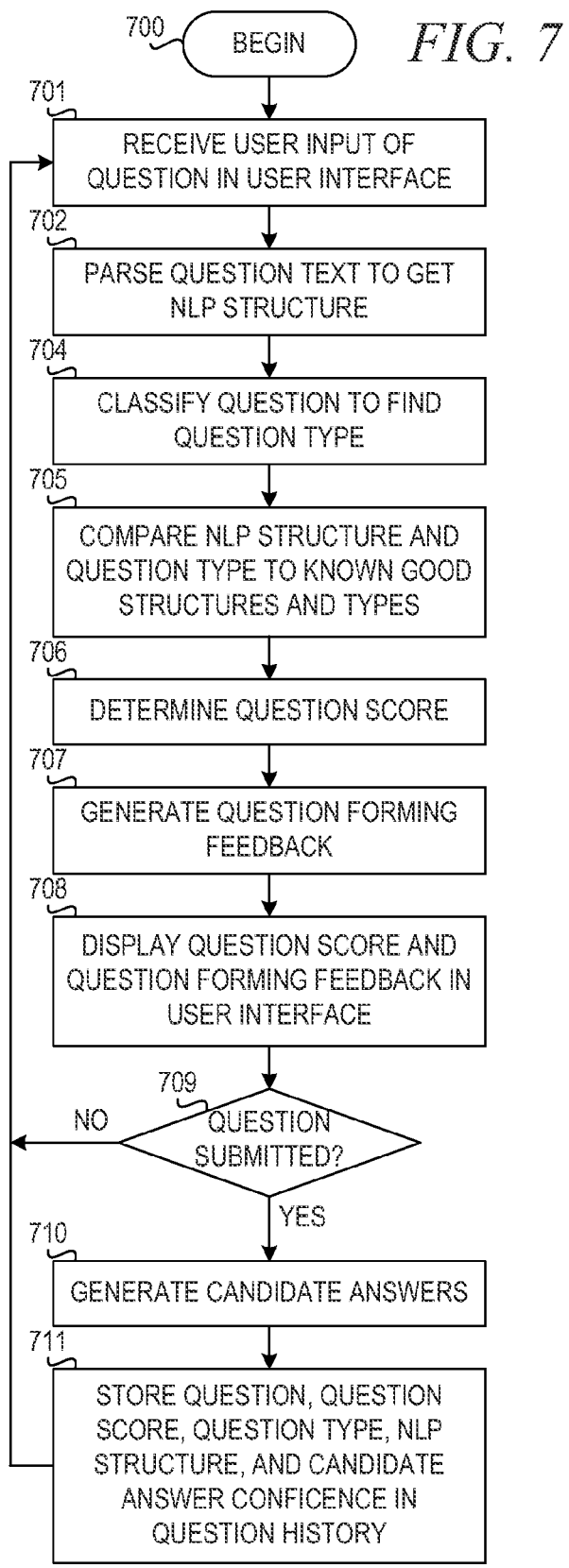
FIG. 7 is a flowchart illustrating operation of a mechanism for displaying a question quality score and question forming feedback for a question being asked of a question answering system.

FIG. 7 is a flowchart illustrating operation of a mechanism for displaying a question quality score and question forming feedback for a question being asked of a question answering system. Operation begins (block 700), and the mechanism receives user input of a question in a user interface (block 701). The mechanism parses question text to get the natural language processing (NLP) structure (block 702). The mechanism then classifies the question to find the question type (block 704).

The mechanism then compares the NLP structure and question type to known good structures and types (block 705). The QA system stores a question history. For each question type, the QA system maintains the questions, candidate answers, confidence scores, and user ratings for the most highly ranked questions and answers. The mechanism uses these questions as a baseline for each question type to determine the question strength score. The mechanism then determines the question strength score based on confidence scores of the questions of the same question type in the question history (block 706).

The mechanism also generates question forming feedback (block 707). The question forming feedback includes tips for reforming the question to achieve a higher question strength score and, thus, a higher likelihood of receiving a correct answer with high confidence. The mechanism displays the question strength score and the question forming feedback in the user interface (block 708). The mechanism may display the question strength score as a segmented bar, for example. The mechanism may display the question forming feedback in response to the user clicking on or hovering the mouse over the segmented bar.

The mechanism then determines whether the question has been submitted to the QA system for an answer (block 709). If the mechanism determines the question has not been submitted, operation returns to block 701 to receive user input of the question in the user interface. This user input may be modification of the input question or a new question. Thus, the mechanism is capable of providing real-time feedback of the question strength and question forming tips as the user types, modifies, and refines the question.

If the mechanism determines the question has been submitted in block 709, the QA system generates candidate answers to be returned to the user (block 710). The QA system then stores the question, the question strength score, the question type, the NLP structure, and candidate answer confidence in the question history (block 711). As discussed above, the mechanism will then use the information in the question history to determine the question strength of subsequent questions. Thereafter, operation returns to block 701 to receive user input of the next question in the user interface.

Thus, the illustrative embodiments provide a mechanism for automatically generating and presenting question strength feedback to the user of a question answering system in real time. The mechanism also presents tips on improving the question. The end user then asks better questions, improving the user's experience, and increasing the return on investment for the customer.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a question answering system, causes the question answering system to:
   receive question text comprising at least a portion of a question to be submitted to the question answering system in a user interface;
   determine a question strength score for the question text, wherein the question strength score represents a likelihood the question text will result in a correct answer with high confidence;
   present a graphical representation of the question strength score in the user interface;
   generate a question forming tip for rephrasing the question text based on the comparison of a natural language processing structure of the question text and a question type of the question text to known good structures and types in a question history; and
   present the question forming tip in the user interface.

2. The computer program product of claim 1, wherein determining the question strength score comprises:
   parsing, by a parser in the question answering system, the question text to obtain the natural language processing structure of the question text; and
   classifying, by a classifier in the question answering system, the question text to identify a question type.

3. The computer program product of claim 2, wherein determining the question strength score further comprises comparing the natural language processing structure of the question text and the question type to the known good question structures and question types in the question history.

4. The computer program product of claim 3, wherein determining the question strength score further comprises determining the question strength score based on confidence scores of the known good structures and types in the question history.

5. The computer program product of claim 1, wherein presenting the graphical representation of the question strength score comprises presenting the graphical representation in real time as a user inputs the question text into the user interface.

6. An apparatus comprising:
   a processor; and
   a memory coupled to the processor, wherein the memory comprises instructions which, when executed by the processor, cause the processor to:
   receive question text comprising at least a portion of a question to be submitted to a question answering system in a user interface;
   determine a question strength score for the question text, wherein the question strength score represents a likelihood the question text will result in a correct answer with high confidence;
   present a graphical representation of the question strength score in the user interface;
   generate a question forming tip for rephrasing the question text based on the comparison of a natural language processing structure of the question text and a question type of the question text to known good structures and types in a question history; and
   present the question forming tip in the user interface.

7. The apparatus of claim 6, wherein determining the question strength score comprises:
   parsing the question text to obtain a natural language processing structure of the question text;
   classifying the question text to identify a question type;
   comparing the natural language processing structure of the question text and the question type to known good structures and types in a question history; and
   determining the question strength score based on confidence scores of the known good question structures and question types in the question history.

8. The apparatus of claim 6, wherein presenting the graphical representation of the question strength score comprises presenting the graphical representation in real time as a user inputs the question text into the user interface.

9. The computer program product of claim 2, wherein parsing the question text to obtain the natural language processing structure of the question text comprises identifying a focus or a lexical answer type.

10. The computer program product of claim 9, further comprising presenting a graphical indicator of the focus or the lexical answer type within the question text in the user interface.

11. The computer program product of claim 4, further comprising:
   responsive to the user submitting the question text to the question answering system, generating a candidate answer having a respective confidence score; and
   storing the question text, the natural language processing structure of the question text, the question type of the question text, and the confidence score in the question history.

12. The computer program product of claim 1, wherein presenting the question forming tip in the user interface comprises presenting the question forming tip in response to user interaction with the graphical representation of the question strength score.

13. The apparatus of claim 7, wherein determining the question strength score further comprises comparing the natural language processing structure of the question text and the question type to the known good question structures and question types in the question history.

14. The apparatus of claim 13, wherein determining the question strength score further comprises determining the question strength score based on confidence scores of the known good structures and types in the question history.

15. The apparatus of claim 7, wherein parsing the question text to obtain the natural language processing structure of the question text comprises identifying a focus or a lexical answer type.

16. The apparatus of claim 15, further comprising presenting a graphical indicator of the focus or the lexical answer type within the question text in the user interface.

17. The apparatus of claim 14, further comprising:
responsive to the user submitting the question text to the question answering system, generating a candidate answer having a respective confidence score; and
storing the question text, the natural language processing structure of the question text, the question type of the question text, and the confidence score in the question history.

18. The apparatus of claim 6, wherein presenting the question forming tip in the user interface comprises presenting the question forming tip in response to user interaction with the graphical representation of the question strength score.

\* \* \* \* \*